(12) United States Patent
Seidel

(10) Patent No.: US 11,718,125 B2
(45) Date of Patent: Aug. 8, 2023

(54) WHEEL OF A VEHICLE

(71) Applicant: Bayerische Motoren Werke Aktiengesellschaft, Munich (DE)

(72) Inventor: Mike Seidel, Schoeneck (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 456 days.

(21) Appl. No.: 16/955,154

(22) PCT Filed: Dec. 14, 2018

(86) PCT No.: PCT/EP2018/085022
§ 371 (c)(1),
(2) Date: Jun. 18, 2020

(87) PCT Pub. No.: WO2019/121410
PCT Pub. Date: Jun. 27, 2019

(65) Prior Publication Data
US 2020/0384800 A1  Dec. 10, 2020

(30) Foreign Application Priority Data
Dec. 20, 2017  (DE) .................... 10 2017 223 336.2

(51) Int. Cl.
*B60B 7/00* (2006.01)
*B60B 7/04* (2006.01)
(Continued)

(52) U.S. Cl.
CPC .............. *B60B 7/0013* (2013.01); *B60B 7/04* (2013.01); *B60B 7/066* (2013.01); *F16F 15/324* (2013.01); *F16F 15/345* (2013.01)

(58) Field of Classification Search
CPC ......... B60B 7/0013; B60B 7/04; B60B 7/066; B60B 1/0207; B60B 1/0223; F16F 15/324; F16F 15/345
See application file for complete search history.

(56) References Cited

U.S. PATENT DOCUMENTS 1,746,476 A * 2/1930 House, Jr. ............. F16F 15/324
                                                301/5.21
2,719,756 A * 10/1955 Duke, Jr. ................ F16F 15/36
                                                301/5.22
(Continued)

FOREIGN PATENT DOCUMENTS

DE        1 101 196 B     3/1961
DE        1 948 955 A1    7/1970
(Continued)

OTHER PUBLICATIONS

Chinese-language Office Action issued in Chinese Application No. 201880079415.9 dated Jul. 28, 2022 with English translation (15 pages).
(Continued)

*Primary Examiner* — Frank B Vanaman
(74) *Attorney, Agent, or Firm* — Crowell & Moring LLP

(57) ABSTRACT

A wheel for a vehicle has a wheel rim, a hub portion, and at least one spoke which connects the hub portion to the wheel rim, and also at least one cover element which at least partially covers the spoke region. The cover element is designed to, in the installed position thereof, produce an imbalance-free state of the wheel.

14 Claims, 4 Drawing Sheets

(51) Int. Cl.
  *B60B 7/06* (2006.01)
  *F16F 15/32* (2006.01)
  *F16F 15/34* (2006.01)

(56) References Cited

U.S. PATENT DOCUMENTS

| | | | |
|---|---|---|---|
| 3,532,385 A | 10/1970 | Foster et al. | |
| 4,563,042 A | 1/1986 | Seitz et al. | |
| 4,591,210 A | 5/1986 | Nickoladze | |
| 4,891,981 A | 1/1990 | Schonfeld | |
| 5,538,059 A * | 7/1996 | Brayer | B60C 15/024 301/5.21 |
| 5,564,791 A | 10/1996 | Chase et al. | |
| 5,647,642 A * | 7/1997 | Word | B60B 3/007 301/5.21 |
| 7,246,860 B1 * | 7/2007 | Seitz | B60B 7/006 301/37.108 |
| 7,425,041 B2 * | 9/2008 | Passarotto | B60B 21/062 301/58 |
| 2009/0025476 A1 | 1/2009 | Braghiroli | |
| 2011/0309670 A1 * | 12/2011 | Taylor | B60B 3/10 301/64.101 |
| 2014/0292062 A1 * | 10/2014 | Luzanilla | B60B 7/0066 29/894.35 |
| 2018/0281511 A1 * | 10/2018 | Boeriswyl | B60B 7/065 |
| 2019/0105942 A1 * | 4/2019 | Webber | B60B 7/0013 |

FOREIGN PATENT DOCUMENTS

| | | |
|---|---|---|
| DE | 32 37 544 A1 | 4/1984 |
| DE | 41 38 824 A1 | 5/1993 |
| DE | 10 2016 001 365 A1 | 1/2017 |
| EP | 0 271 751 A2 | 6/1988 |
| EP | 0 290 867 A2 | 11/1988 |
| EP | 0 271 751 B1 | 7/1991 |
| EP | 2 019 303 A1 | 1/2009 |
| JP | 6-85101 U | 12/1994 |
| JP | 2008-120371 A | 5/2008 |

OTHER PUBLICATIONS

International Search Report (PCT/ISA/210) issued in PCT Application No. PCT/EP2018/085022 dated Feb. 28, 2019 with English translation (six (6) pages).

German-language Written Opinion (PCT/ISA/237) issued in PCT Application No. PCT/EP2018/085022 dated Feb. 28, 2019 (seven (7) pages).

German-language Search Report issued in German Application No. 10 2017 223 336.2 dated Oct. 5, 2018 with partial English translation (13 pages).

Chinese-language Office Action issued in Chinese Application No. 201880079415.9 dated Mar. 1, 2023 with English translation (14 pages).

* cited by examiner

WHEEL OF A VEHICLE

BACKGROUND AND SUMMARY OF THE INVENTION

The invention relates to a wheel for a vehicle and to a method for producing and balancing a wheel.

The prior art discloses various methods by which a vehicle wheel can be balanced. The term "balancing" refers to the reduction or removal of an unbalance. Any rigid body rotating about a fixed axis has an unbalance which can lead to vibrations (oscillations), noise and increased wear and, at high rotational speeds, even to destruction. If the manufacturing tolerance leads to an excessive unbalance, equalization of the mass distribution has to occur individually on this body. Such unbalances due to manufacturing tolerances and just described will also be referred to as standard unbalances in the course of this application.

During the balancing of vehicle wheels, a machine, a so-called wheel balancing machine, rotates the wheel or a rim with a mounted tire. The axle on which this occurs is equipped with sensors. An electronic evaluation unit calculates the unbalance from the measured values of the forces occurring on the axle. Balancing weights are then fastened to the rim in order to equalize the unbalance. Such balancing weights are known in different materials and forms. An example of a method for balancing a vehicle tire is specified in EP 2 019 303 A1.

As already stated, manufacturing tolerances of the rim or else of the vehicle tire itself are what can cause an unbalance of the wheel. Here, a conventional wheel balancing machine is capable of balancing such tolerances of up to about 60 grams (per position on the wheel or on the rim) without problem using known additional balancing weights. Higher unbalances, that is to say of more than 60 grams (also abbreviated to g), can be balanced only with difficulty using conventional, industrially known balancing machines.

However, the aforementioned balancing weights always mean additional weight, which should generally be avoided in vehicle construction, in particular with regard to low fuel or energy consumption. It is the case here that the higher the unbalance, the higher also are the balancing weights and, consequently, the wheel per se becomes increasingly heavier.

Furthermore, in particular to avoid additional unbalances (that is to say in addition to the above-described standard unbalances due to the tire and rim tolerances), vehicle wheels as are known from the prior art are customarily designed to be balanced in their entirety. This means that, for example, the spokes of a wheel are always arranged within the circle diameter in such a way that the center of gravity of the wheel is always arranged on the wheel center axis or the wheel axis of rotation (except for the deviation due to the aforementioned standard unbalances). Therefore, the spokes are always arranged symmetrically, on the circular ring portion of the wheel or at least with respect to the desired position of the center of gravity of the wheel on the wheel center axis, to a plane extending through the wheel center axis. In order thus to avoid an unbalance higher than the, in any case, unavoidable standard unbalance, the prior art always provides wheels which are designed to be substantially balanced in their entirety, that is to say through their nature.

However, it may be desirable for various reasons for the spokes of a wheel not to be arranged symmetrically in their entirety or not to be designed in their nature such that they achieve a substantially balanced wheel. For example, it is possible that, for reasons of installation space or design, a spoke arrangement on the wheel results which constitutes a wheel which, apart from the aforementioned standard unbalances, is designed to be unbalanced. Such an unbalance generated by the geometry of the spokes can be equalized only with difficulty by the conventional wheel balancing machines.

It is thus the object of the invention to specify a wheel of a vehicle which, by virtue of its nature, has an unbalance deviating from an unbalance due to manufacturing tolerances of the rim or of the tire and can nevertheless be balanced with a conventional wheel balancing machine without using very heavy balancing weights, and to specify a method by which the balancing of such a wheel can be realized without increased outlay.

The object is achieved by a wheel of a vehicle and by a method for producing and balancing a wheel of a vehicle according to the claimed invention. Advantageous embodiments and developments form the content of dependent claims.

What is proposed is a wheel for a vehicle, in particular for a motor vehicle, which comprises a rim, a hub portion and at least one spoke which connects the hub portion to the rim.

Furthermore, the wheel comprises at least one preferably at least approximately planar covering element which at least partially covers a spoke region.

The spoke region describes that circular ring-shaped region on the wheel in which at least one spoke connecting the hub portion to the rim is customarily arranged.

The covering element can thus cover the spoke or a plurality of spokes and/or a spoke interspace. Here, the "surface" covered by the preferably at least approximately planar covering element is in particular that surface which is parallel to the disk plane or circle plane of the wheel.

An aforementioned spoke interspace is provided when there are arranged at least two spokes which form a preferably at least partially open space, the spoke interspace, in the circular ring portion of the wheel, that is to say between the hub portion and the rim.

The aforementioned at least one covering element can then, for example, cover a spoke (completely or partially) and/or a spoke interspace (completely or partially) preferably flat in a plane parallel to the perpendicular wheel plane or to the plane which defines the circular surface for the spoke region. Preferably, it is designed to be at least approximately flat and thus to cover a certain region, that is to say preferably while leaving free some regions of the spoke region.

There is thus accordingly provision that the covering element at least partially covers the circular ring portion of the wheel that extends from the hub portion as far as the rim of the wheel (as considered from an external view of the installed wheel of the vehicle) and in which the spokes are customarily arranged.

Here, such a covering element is preferably an at least approximately planar element which is formed, for example, from a plastic or some other material.

Furthermore, however, it is also conceivable that the covering element constitutes a display or an indicating device. In any case, an at least approximately planar body or element is preferred which allows the aforementioned region (between the hub portion and the rim) to be covered at least partially flat.

What is to be understood by an at least approximately planar design of the covering element within the sense of this invention is an element which is flattened in its entirety and is designed to be preferably at least approximately plate-shaped. Here, in spite of the generally flattened or planar or plate-shaped design, there can be provided deviations for example in the thickness or depth of the material. Particularly from an aerodynamic point of view, an at least approximately planar covering element on the wheel or on the spoke region of the vehicle is desirable.

There is expediently provision that only the covering element in the installed state produces an unbalance-free state of the wheel. By implication, this means that the covering element serves as a weight for equalizing an unbalance (=standard unbalance) not conventionally known from the prior art, that is to say for equalizing an unbalance occurring in addition to the standard unbalance.

Within the sense of this invention, a standard unbalance means that unbalance which, due for example to manufacturing tolerances, occurs on the rim or on the tire of the wheel and which, as already explained in the prior art, can be equalized or balanced by additional balancing weights in a simple manner in a balancing process after producing the wheel and after mounting the tire.

A covering element as balancing weight saves on additional, separate balancing weights which are fitted onto the rim in the prior art. Here, the covering element advantageously performs both a covering function (or else further functions, such as for example aerodynamic optimization at the wheel) and the function of weight equalization on the wheel.

In a preferred embodiment of the invention, there is further provision that the covering element partially covers the spoke region and at least partially covers the hub portion. With particular preference here, the covering element covers a spoke and the entire hub region of the wheel. Expressed in other words, it is preferred that the covering element concomitantly covers the hub region beyond the spoke region or beyond a certain spoke area.

In a further advantageous embodiment of the invention, a wheel is provided which, before the balancing process, is designed in such a way that it has an additional unbalance (in addition to the aforementioned standard unbalance) by virtue of the nature of certain wheel components. With preference here, the position of the center of gravity of the wheel deviates considerably (that is to say deviating from the standard unbalance) from the wheel center axis (before a balancing process and before mounting the covering element).

In the prior art, the wheels are designed in their nature in such a way that, apart from the standard unbalance, they are balanced in their entirety.

Such wheel components which are arranged on the wheel or are of such nature that an additional unbalance occurs can be, for example, the spoke or a plurality of spokes, the rim, a rim bed, a wheel contact surface or the hub portion.

With particular preference, the nature of one or more spokes of the wheel causes the aforementioned unbalance.

In a preferred exemplary embodiment of the invention, there is provision that the wheel comprises at least three spokes which connect the rim to the hub portion, wherein a first spoke differs in its nature from the other spokes. Here, the remaining spokes do not differ from one another in their nature and geometry. This results in an aforementioned additional unbalance on the wheel that is not known in this way in a wheel from the prior art.

Here, the aforementioned spoke can differ from the other spokes for example in its geometric design, that is to say for example in it shape, material, weight, dimensions or in its configuration as such.

Here, there is further preferably provision that the wheel, even before the covering element has been fitted onto it, is designed in such a way that the aforementioned first spoke (that which differs in its nature from the other spokes) is in such relationship with the hub portion that the first spoke forms, with the hub portion, a common wheel portion.

Machining the spoke and the hub portion in a correspondingly similar manner thus gives the visual impression, when the wheel is viewed from outside, that the hub portion and the first spoke constitute a coherent wheel component or a coherent wheel portion.

In order to achieve such a coherent visual impression, it is possible for example that, by comparison with the material transition between the hub portion and the other spokes, the material transition between the first spoke and the hub portion is designed to be considerably more flowing or without an (or with a smaller) interruption or a smaller offset or no offset.

It is thus particularly preferred that the material transition between the hub portion and the first spoke differing from the others is designed in such a way that the hub portion and the first spoke constitute a coherent wheel portion.

Furthermore, it is preferred that an offset in the material is arranged between the hub portion and the remaining spokes (that is to say those which do not differ from one another in their nature), with the result that the respective "spokes and hub portion" wheel portions clearly differ from one another visually. An exemplary offset can be gathered in more detail from the drawings.

In a further preferred embodiment of the invention, the covering element, which ultimately sets the wheel into a balanced state, is formed from two different material layers. The use of a covering element which is produced from two different material layers makes it possible to utilize the advantages of different materials and thus to provide a covering element which optimally meets the requirements.

There is thus provision in a preferred embodiment of the invention that the covering element comprises a metal layer and a plastics layer which is produced in a back injection-molding process and thus joined to the metal layer. With the covering element in the installed state between the spokes of the wheel, the metal layer can then preferably be arranged on the outside, that is to say on the wheel on the side facing away from the vehicle, and the plastics layer can be arranged on the wheel or on the spokes on the inner side, that is to say on the side facing the vehicle.

By virtue of the material, the metal layer thus meets the required strength requirements placed on the covering element, whereas the plastics layer affords additional retention and can be produced in a simple manner, for example, in a back injection-molding process and can be joined to the metal layer in the same process step.

The required weight of the covering element can be ensured for example by a relatively thin metal layer in relation to the plastics layer. With particular preference, the metal layer thickness is in an order of magnitude from 0.3 mm to 0.5 mm, and the plastics layer thickness is in an order of magnitude from 2.5 mm to 4 mm.

As already stated, the plastics layer is here attached to the metal layer in a back injection-molding process, with a positive additional effect being provided by the fact that protection from corrosion of the cut edge between metal and plastic can be produced and infiltration of the surface thereof by rust or corrosion or the like can be avoided.

As an alternative to the aforementioned two-layer design of the covering element, another material and structure composition is also conceivable. Here, it is possible for example that the covering element is formed from only a single material.

The weight and the position of the covering element (that is to say the area of the coverage of the hub portion and of the spoke region, and the exact positioning of the covering element) is in any case determined in such a way that the wheel with installation of the covering element is intrinsically balanced (apart from the aforementioned standard unbalances).

In a next preferred embodiment of the invention, there is further provision that the first spoke (that is to say the one which differs in its nature from the remaining spokes) comprises a receiving device or a fastening device for receiving or for fastening a mass body.

Such a mass body is a body which is loaded with a certain or selected weight and which is required for the balancing process of the wheel that is explained below. This mass body can be for example a cylindrical or round element or some other element of compact design.

The weight of the mass body here corresponds at least approximately to the weight of the covering element, since it simulates the covering element in the wheel balancing process explained below.

For this reason, the position of the mass body and hence of the receiving device therefor on the first spoke is also determined exactly.

There is preferably provision that a mass body is arranged on the first spoke of the wheel.

The receiving device or fastening device for the mass body can be chosen depending on the type of fastening. For example, the mass body can be adhesively bonded, screwed, clipped or hooked to the spoke.

With particular preference, the receiving device is a circular clip device or cutout in which the mass body can be clipped or inserted.

Furthermore, there is preferably provision that the first spoke (that is to say the one which differs in its nature from the remaining spokes) comprises a receiving device or a fastening device for receiving or for fastening the covering element.

With particular preference here, the aforementioned receiving device for receiving the mass body at the same time also constitutes the receiving device for receiving the covering element.

The covering element can then be clipped to the first spoke, for example.

There is also further preferably provision here that a receiving device for receiving the covering element is provided on the hub portion. Here, too, a clip connection is particularly preferably provided.

Besides the aforementioned clipping operation, however, other possibilities of fastening the covering element to the first spoke or to the hub portion are also conceivable. For example, the covering element can be adhesively bonded, screwed or hooked to the first spoke or the hub portion.

Also proposed is a method for producing and for balancing a wheel according to the invention. The wheel to be balanced here is formed according to the invention.

During the production of the wheel, in particular a wheel of a vehicle is initially forged from a light metal, such as for example aluminum, and then machined corresponding to the desired geometry.

Here, a wheel of a vehicle is preferably produced which is unbalanced in its entirety through its nature. Here, this unbalance does not comprise the above-explained standard unbalance, but extends beyond this. The wheel is produced here in such a way that, by virtue of the nature of the wheel portions (rim, spokes, hub portion, etc.), the center of gravity of the wheel is shifted away from the wheel center axis.

With particular preference, the wheel is produced or machined here in such a way that the preferably targeted or desired unbalance is realized by the formation of a spoke.

Here, in particular a wheel having a rim, a hub portion and at least three spokes which connect the hub portion to the rim is produced. Here, a first spoke of the at least three is preferably machined in such a way that it differs in its nature from the other (identical) spokes.

With further preference here, as much material as possible is removed from the first spoke such that it has considerably less weight and material than the other spokes and the subsequent balancing can occur with as little weight as possible. The aforementioned unbalance results from such a weight difference.

With particular preference here, as much material as possible is removed from the first spoke that there is nevertheless still sufficient strength available for use of the wheel.

There is further preferably provision that the hub portion of the wheel is also machined. Here, this machining of the hub portion of the wheel preferably occurs in the course of the machining of the first spoke, with the result that the hub portion and the first spoke form a common wheel portion. It is possible for example for this purpose for the same amount of material to be removed from the first spoke as from the hub portion such that an at least approximately flowing material transition exists between these two portions or such that the two wheel portions act visually as a coherent wheel portion.

With regard to the other spokes, there can then for example be produced an offset in the material with respect to the hub portion such that said spokes can be clearly identified as individual wheel components which can be differentiated from the hub portion.

There is further preferably provision to provide or incorporate one or more receiving devices or cutouts in the first spoke or in the hub portion of the wheel during the machining of the wheel. These cutouts serve for the subsequent reception of a mass body or of the covering element.

After producing and machining the wheel, the wheel now has an unbalance (in addition to the standard unbalance). Here, the additional unbalance, which is caused for example by the different nature of the first spoke, lies particularly preferably in a range of more than 60 grams, particular preferably in a range between 60 grams and 75 grams. The prior art does not disclose an industrially known balancing machine which is capable of equalizing unbalances higher than 60 grams.

Before the wheel is balanced, a next step involves the wheel tire being mounted onto the rim or onto the rim bed of the wheel. At this point, the wheel is still unbalanced. Specifically, after mounting the tire, the wheel has both the aforementioned standard unbalance (caused by manufacturing tolerances of the wheel and of the tire) and the additional unbalance generated by the nature of the wheel.

The balancing process of the wheel begins subsequent to the mounting of the tire.

Here, the wheel according to the invention and the method according to the invention for balancing the wheel allow a balancing process on a conventional balancing machine, as is known in industrial practice, in spite of the very high unbalance of the wheel.

For this purpose, prior to balancing, a mass body having an exactly tailored weight is introduced into the receiving device or cutout, which is incorporated in the machining process of the wheel and provided for the mass body, on the wheel, or preferably on the first spoke.

Here, the mass body constitutes only for the balancing process a type of equalizing weight which equalizes the additional unbalance, caused by the nature of the wheel or preferably caused by the differently designed first spoke of the wheel, during the balancing process.

As a result of introducing the mass body, the additional unbalance is removed for the balancing process and the wheel is balanced in its entirety for the balancing process apart from the aforementioned standard unbalance.

The temporary introduction of such a mass body into the wheel for the balancing operation allows balancing of the wheel on a conventional, industrially known balancing machine from the prior art, although the wheel per se, by virtue of the unbalance actually prevailing (that is to say without the mass body), is too highly unbalanced for the wheel to be able to be balanced in such a conventional balancing machine.

The mass body preferably has a weight of more than 60 grams and is arranged at a position in the wheel which is capable of realizing an equalization of the additional unbalance.

After the balancing of the wheel (with the arranged mass body), the mass body is removed from the wheel again such that the desired additional unbalance prevails again and the wheel is balanced in terms of the standard unbalance.

The covering element is then arranged on the wheel balanced in terms of the standard unbalance into the receiving device, provided therefor, on the wheel or on the first spoke and on the hub portion.

The receiving device for the mass body and that of the covering element is particularly preferably the same here. It is thus possible to save on a machining or manufacturing process.

Furthermore, it is preferred that the covering element is fitted onto the wheel in such a way that there is a releasable connection between the covering element and the wheel. For example, a clip connection can come into consideration here. This has the advantage in particular that the covering element can be demounted and exchanged at any time.

The aforementioned invention makes it possible for a wheel, which is designed not to be balanced in its entirety by virtue of its geometry or nature, to continue to be balanced in a conventional balancing process and thereby at the same time to create new design possibilities in terms of the wheel geometry and in particular of the spoke geometry. For example, a covering element can thus cover the hub region and also the first spoke.

The balancing method according to the invention by way of the mass body advantageously makes it possible to bring about higher mass equalizations (that is to say preferably in a range of more than 60 grams per position on the wheel) than in current known industrial methods.

These and further features emerge not only from the claims and from the description but also from the drawings, wherein the individual features can be realized in each case on their own or as a plurality in the form of subcombinations in an embodiment of the invention and can represent advantageous embodiments which are protectable on their own account for which protection is claimed here.

The invention will be further explained below on the basis of seven exemplary embodiments.

All features described in detail here may be essential to the invention.

DETAILED DESCRIPTION OF THE DRAWINGS

Figure 1:
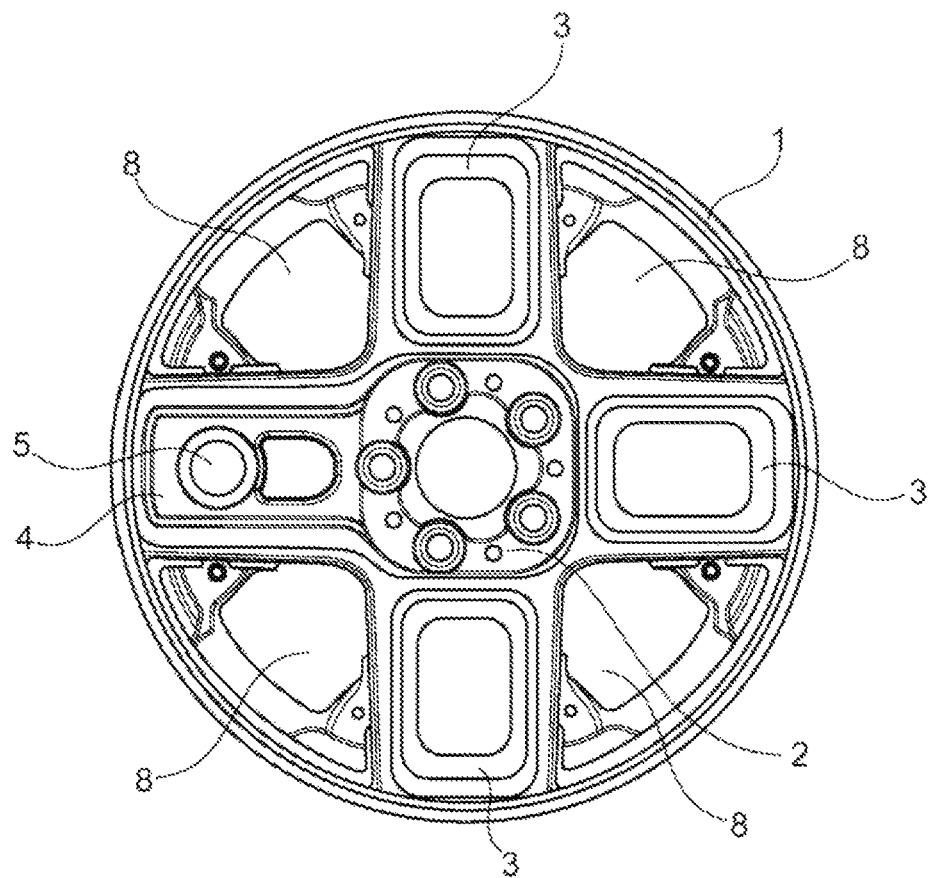
FIG. 1 shows an exemplary wheel according to the invention of a vehicle in a three-dimensional front view at a first stage of assembly and manufacture.

FIG. 1 shows an exemplary wheel according to the invention of a vehicle in a front view. The wheel comprises a rim 1, a hub portion 2 and four spokes 3, 4 which connect the hub portion 2 to the rim 1. Here, a first spoke 4 is designed to be different geometrically or in terms of its nature from the other three spokes 3. This embodiment means that the wheel is designed to be unbalanced in its entirety in a targeted manner (after the production and machining process).

As is evident in FIG. 1, the first spoke and the hub portion are here machined in such a way that they act visually as a common wheel portion. Here, a material offset delimits this common "first spoke 4-hub portion 2" wheel portion. Furthermore, such an amount of material is removed from the first spoke 4 that this side of the wheel is designed to be considerably lighter and therefore creates the aforementioned unbalance. Here, the unbalance of the wheel from FIG. 1 is in an order of magnitude of more than 60 grams per position on the wheel. In addition to this targeted unbalance there are standard unbalances which result from manufacturing tolerances or other tolerances.

The wheel indicated in FIG. 1 allows an asymmetrical spoke geometry, with the first spoke 4 being extended as it were by the hub portion 2 and thus acting as a spoke. For design-related reasons and for reasons of installation space, it is desirable for one spoke to be configured to be wider or longer than the others. It is then possible for example for relatively large components to be integrated on or behind or in the aforementioned spoke or, for example, for a display which is as wide or flat as possible to be placed.

There is further provision that a material offset 2.2, which is not present between the first spoke 4 and the hub portion 2, is arranged between the hub portion 2 and the spokes 3 adjoining the latter.

Also provided on the first spoke 4 are a plurality of cutouts, of which a cutout 5 is provided for subsequently receiving the mass body 6.

Figure 2:
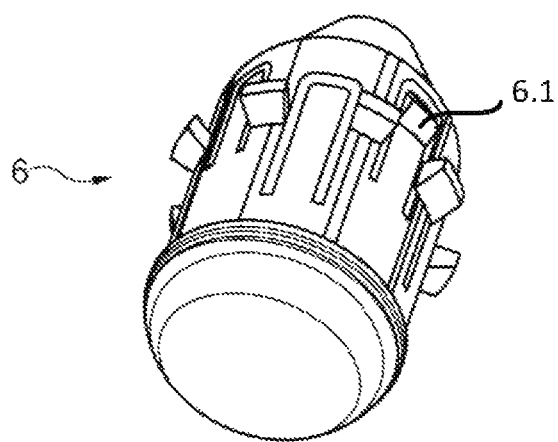
FIG. 2 depicts an exemplary mass body as equalizing weight in a three-dimensional view.

Balancing of a wheel having an unbalance of more than 60 grams, as is shown in FIG. 1, cannot be achieved with conventional industrial balancing machines. In order, however, to ensure that there is no need to develop a balancing machine of complex configuration to balance the wheel from FIG. 1, but the wheel, which is shown in FIG. 1, can be balanced in a conventional balancing machine, a mass body 6 is provided for the balancing process. Such a mass body 6 is depicted in FIG. 2.

Here, there is provision in this case that, before the balancing process of the wheel, the mass body 6 is clipped into the receptacle or cutout 5, which is provided therefor, with a clip connection 6.1 into the first spoke 4. It is thereby possible for the unbalance, which is caused by the different spoke nature and is more than 60 grams, to be equalized for the balancing process. The mass body 6 thus serves as an equalizing weight for the balancing process, which will be explained in more detail below on the basis of FIG. 7.

Figure 3:
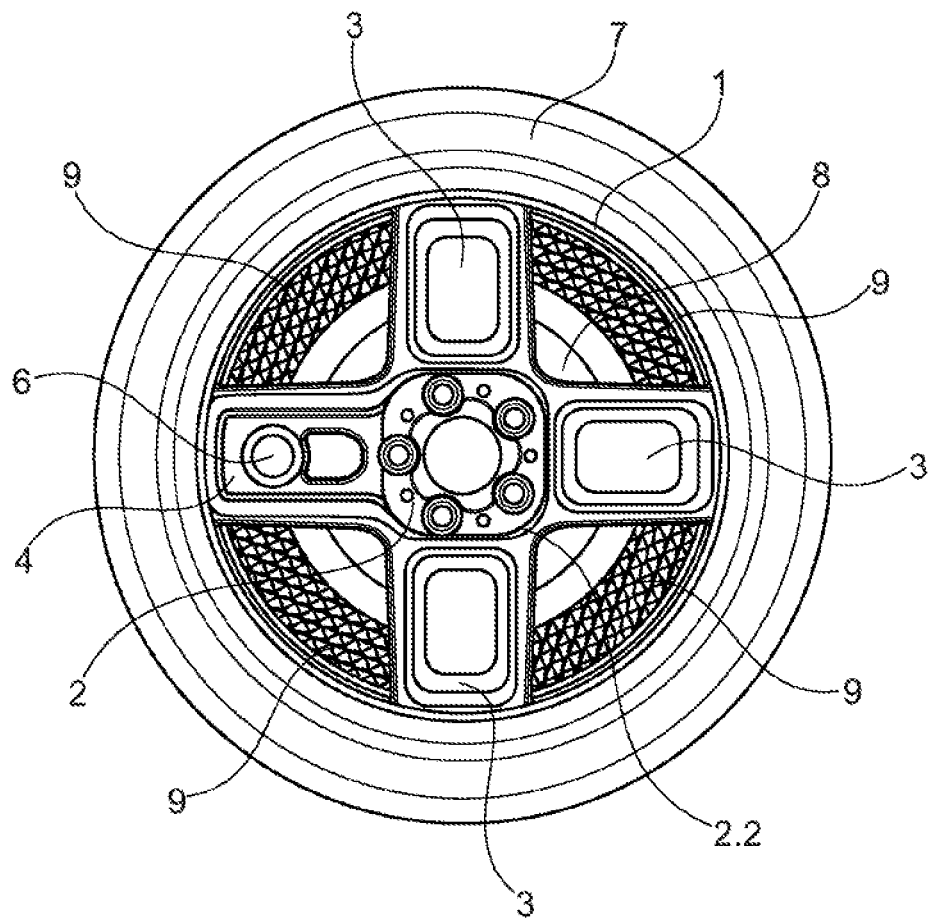
FIG. 3 shows an exemplary wheel according to the invention of a vehicle in a three-dimensional front view at a second stage of assembly and manufacture.

FIG. 3 shows the wheel from FIG. 1 with the mass body 6 installed or clipped in the receptacle 5. Here, in FIG. 3, a tire 7 has already been mounted onto the rim 1. In addition, a plurality of relatively small coverings 9 are mounted in the spoke interspaces 8, said coverings serving for the additional aerodynamic optimization of the wheel but not influencing the unbalance. The clip connection for fastening the mass body 6 to the first spoke 4 is illustrated more precisely in FIG. 5.

Figure 4:
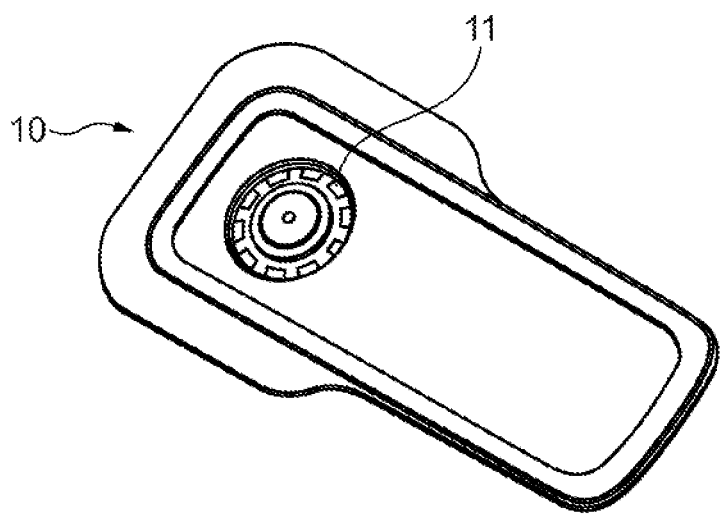
FIG. 4 shows an exemplary covering element in a rear view.

There is furthermore expediently provision that the introduced unbalance on the wheel (which in this case is more than 60 grams and is caused by the different spoke geometry) is equalized only by the arrangement of a covering element 10 on the wheel, which is illustrated by way of example in FIG. 4. Since, after the balancing process, the mass body 6 is removed again, the targeted unbalance, of in this case more than 60 grams, is present in the wheel again. This is equalized again subsequently by arranging the covering element 10.

This means by implication that the covering element 10 has the same weight as the mass body 6. Furthermore, the covering element 10 is designed to be at least approximately flat. This flat design of the covering element 10 has the advantage that, in the installed state on the wheel, it causes an optimum air flow during the travel of the vehicle. Furthermore, it is possible that, in addition to the aerodynamic optimization and the unbalance equalizing function, the covering element 10 can also serve further functions, such as for example an indicating function, that is to say as a display, etc.

The covering element 10 from FIG. 4, like the mass body 6, is in this case also attached by a clip connection 11 to the wheel or more precisely to the hub portion 2. The clip connections 11, 12 for connecting the mass body 6 and the covering element 10 to the wheel are depicted in FIG. 5.

Figure 5:
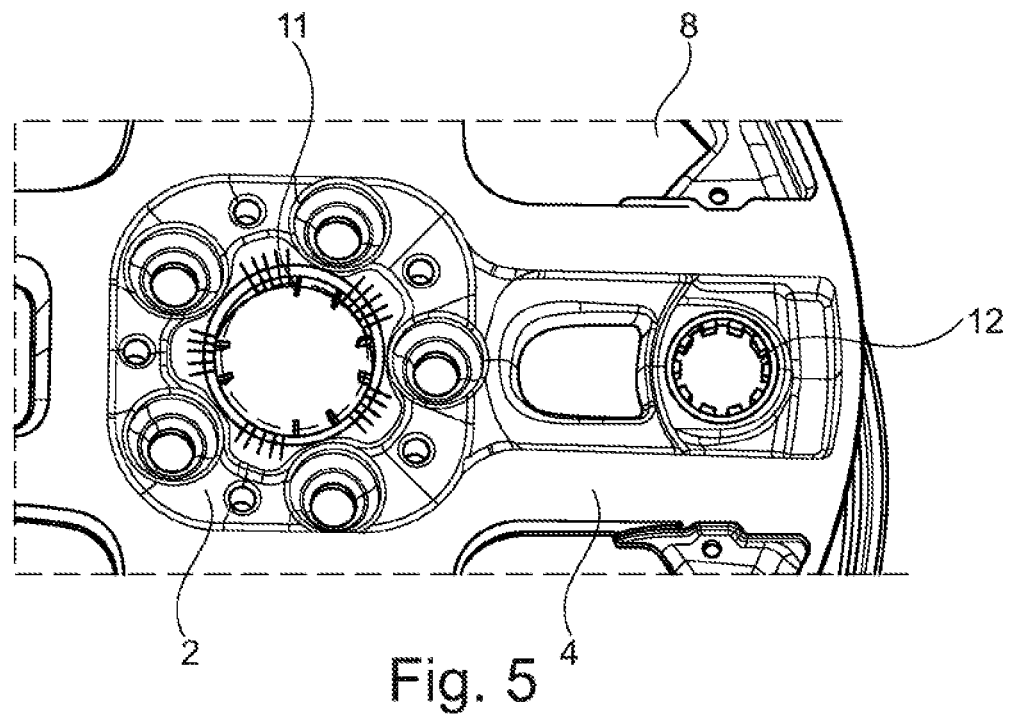
FIG. 5 depicts an exemplary first rim and the hub portion of a wheel according to the invention in a detail in a rear view.

Here, FIG. 5 shows a portion of the wheel in a rear view. Here, in particular the first spoke 4 and the hub portion 2 can be seen in a rear view. As is evident from FIG. 5, two different receiving devices are arranged in the form of clip connections 11, 12, respectively the first clip connection 11 in the hub portion 2 for fastening the cover element 10 and the second clip connection 12 for fastening the mass body 6. It is also possible here for the covering element 10 to additionally be fastened by the second clip connection 12 to the first spoke 4, like the mass body 6.

Figure 6:
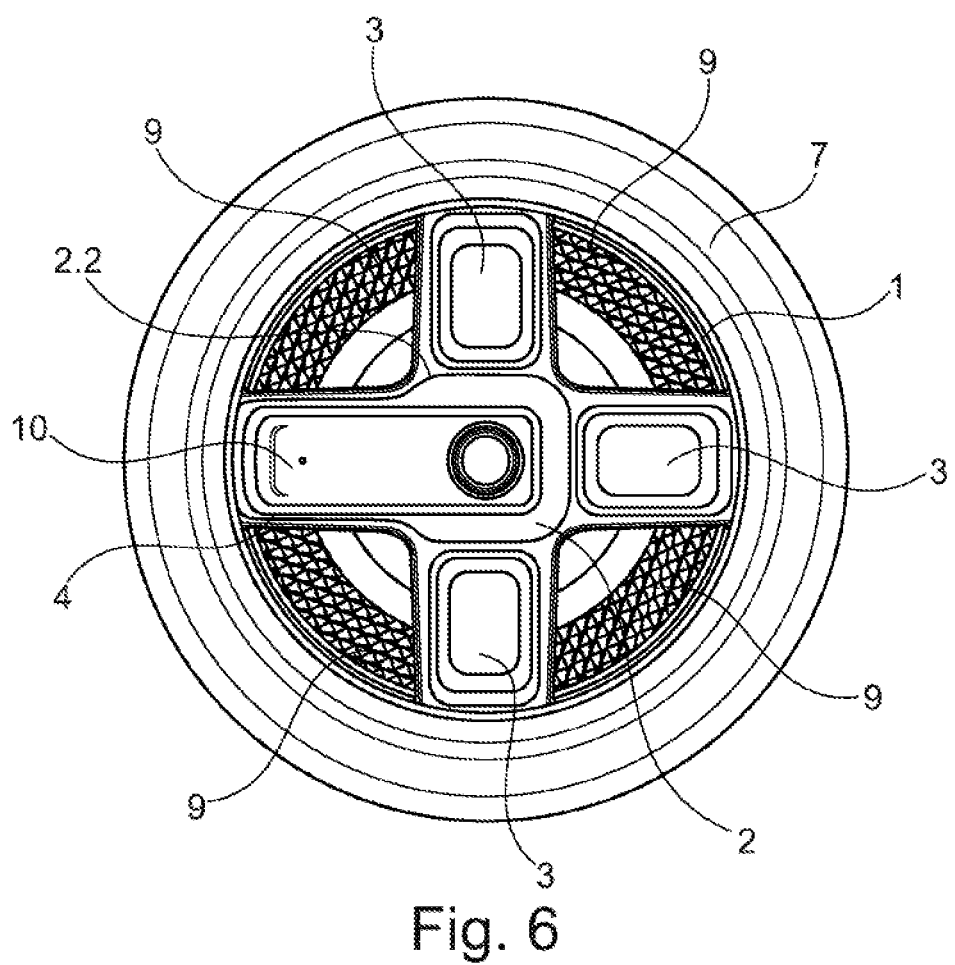
FIG. 6 shows an exemplary wheel according to the invention of a vehicle in a three-dimensional front view at a third stage of assembly and manufacture.

FIG. 6 depicts the wheel from FIG. 1, with the covering element 10 being attached thereto here. As can be seen here, the covering element 10 covers both the first spoke 4 and the hub portion 2. With the covering element 10 installed, the coherent "first spoke 4-hub portion 2" wheel portion can be seen more clearly. The invention makes it possible for a wheel to be able to be configured "asymmetrically" and thus unbalanced in such a way that a covering element or a spoke can be designed to be larger than other spokes and thus can perform functions which require more installation space. For example, the covering element can then be used as a wide display or as an indicating device.

Figure 7:
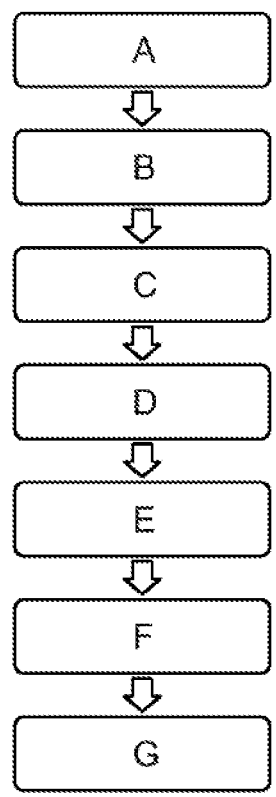
FIG. 7 indicates the individual steps for producing and balancing a wheel.

FIG. 7 describes an example of the individual method steps for balancing and producing the wheel as is indicated in the preceding figures.

The first method step A here is the production of the wheel. Here, the wheel can, for example, be forged and then machined in such a way that a wheel according to FIG. 1 results. The wheel produced here is designed in such a way that, on account of its nature and geometric configuration, it is unbalanced in its entirety. What is concerned here is an unbalance which deviates from the standard unbalance resulting from manufacturing and tire tolerances and extends far beyond it (considered by weight, per position on the wheel). In particular, an unbalance of more than 60 grams per position on the wheel is addressed here.

During the machining of the wheel, the cutouts are produced for receiving a mass body 6 and covering element 10 which are to be subsequently fitted.

As an alternative to the aforementioned different spoke geometry or nature of the spoke, an unbalance introduced in a targeted manner can also be achieved by other measures, for example a different nature of the rim or of the hub portion.

Subsequent to the production and machining of such an intrinsically unbalanced wheel according for example to FIG. 1, it is alternatively possible for further components, for example small coverings 9, as can be seen in FIG. 3, to be mounted onto the wheel in a next method step B. However, such coverings 9 are here fastened to the wheel in such a way that they do not change the balancing thereof. At this point of the manufacturing process, the balancing of the wheel is accordingly still preferably more than 60 grams per position on the wheel.

In a next method step C, the tire 7 is then mounted onto the wheel. The wheel is then formed for example according to FIG. 3. At this point of the method, the wheel still has an unbalance of more than 60 grams per position on the wheel. It is possible as a result of the mounted tire that the aforementioned standard unbalance has increased.

Before the actual balancing operation of the wheel, in the next step, method step D, the aforementioned mass body 6 is, for example as illustrated in FIG. 2, inserted into the cutout 5, which is present for the mass body 6, on the first spoke into the wheel. As already described, the mass body 6 is here preferably connected to the wheel via a clip connection 12 (cf. FIG. 5). Alternatively, however, some other, preferably releasable connection of the mass body 6 to the wheel is also possible. In addition, the mass body 6 can also deviate from the configuration as is depicted in FIG. 2. It is important that the weight of the mass body 6 is designed in a targeted manner for the unbalance of the wheel and equalizes the unbalance (not the standard unbalance) for the balancing process (for balancing the standard unbalance). After mounting the mass body 6, the wheel is no longer loaded with the additional unbalance, but is unbalanced only in the sense of the standard unbalance (that is to say on account of tire and manufacturing tolerances).

Subsequent to the mounting of the tire, in method step E the wheel, which is loaded with the aforementioned standard unbalance, is balanced in a balancing process. Here, the aforementioned mass body 6 is situated on the wheel, with only the standard unbalance having to be equalized. The wheel with the standard unbalance can then be balanced in a balancing process known from the prior art with an industrial balancing machine known from the prior art. This has in particular that advantage that a wheel which cannot actually be balanced using a conventional standard balancing machine (as a result of the actual unbalance of more than 60 grams) can nevertheless be balanced in a conventional balancing machine by virtue of the mass body. It is thus possible to save on costs and outlay.

After method step E, that is to say after the balancing process, the wheel has been balanced with respect to the standard unbalances.

In a next method step F, the mass body 6, which has served as it were as a placeholder for mass equalization in the balancing process, is removed again from the wheel. The wheel is then again loaded with the unbalance (which is preferably more than 60 grams per position on the wheel) prevailing at the start of the production.

Only in a final method step, method step G, is the covering element 10, for example as shown in FIG. 4, mounted onto the wheel. Only with the mounting of the covering element 10, for example as indicated in FIG. 5 by clipping the covering element 10 to the hub portion 2 of the wheel, is the wheel intrinsically balanced.

With particular preference, the covering element 10, which is ultimately configured to balance the entire "wheel" system, is inserted only at the premises of a vehicle dealer. This has in particular that advantage that the covering element 10 can be exchanged or demounted at any time.

FIG. 6 shows a preferred embodiment of the ready-produced wheel according to method step G.

LIST OF REFERENCE SIGNS

1 Rim
2 Hub portion
3 Spoke
4 First spoke
5 Cutout
6 Mass body
7 Tire
8 Spoke interspace
9 Covering
10 Covering element
11 Clip connection
12 Clip connection

What is claimed is:

1. A wheel for a vehicle, comprising:
a rim;
a hub portion;
at least three spokes which connect the hub portion to the rim in a spoke region; and
at least one covering element which at least partially covers the spoke region, wherein
the covering element is configured, in an installed position, to produce an unbalance-free state of the wheel, wherein
a first spoke of the at least three spokes differs from the other spokes,
the other spokes do not differ from one another, whereby the wheel in its entirety without the covering element is unbalanced, and
the first spoke comprises a receiving device for receiving a mass body.

2. The wheel according to claim 1, wherein
the wheel, without the covering element, is designed to be unbalanced with respect to a wheel center axis.

3. The wheel according to claim 2, wherein
the unbalance is produced by a predetermined mass distribution of wheel components.

4. The wheel according to claim 2, wherein
the unbalance of the wheel without the installed covering element is an order of magnitude of more than 60 grams.

5. The wheel according to claim 1, wherein
the covering element partially covers the spoke region and at least partially covers the hub portion.

6. The wheel according to claim 1, wherein
the first spoke is in such relationship with the hub portion to form a common wheel portion.

7. The wheel according to claim 6, wherein
the covering element at least partially covers both the hub portion and the first spoke.

8. The wheel according to claim 6, wherein
an offset in material is arranged between the hub portion and the other spokes, which other spokes are geometrically identical.

9. The wheel according to claim 1, wherein
the covering element is produced from two different material layers.

10. The wheel according to claim 1, wherein
the first spoke and the hub portion comprise a receiving device for receiving the covering element.

11. The wheel according to claim 1, wherein
the receiving device for the mass body is also a receiving device for the covering element.

12. A method for balancing a wheel comprising:
a rim;
a hub portion;
at least one spoke which connects the hub portion to the rim in a spoke region; and
at least one covering element which at least partially covers the spoke region,
wherein
the method for balancing comprises the acts of:
providing the wheel which is designed with a natural unbalance;
mounting a vehicle tire onto the wheel;
introducing a mass body into a receiving device provided for the mass body on the wheel;
balancing a standard unbalance of the wheel with the vehicle tire and the mass body;
removing the mass body; and
fitting the covering element onto a receiving device provided therefor on the wheel.

13. The method according to claim 12, wherein
the mass body is introduced into the receiving device, which is provided for the mass body, of the at least one spoke.

14. The method according to claim 13, wherein, after removal of the mass body, the covering element is fitted into a receiving device onto the at least one spoke.

* * * * *